Patented July 18, 1950

2,515,912

UNITED STATES PATENT OFFICE 2,515,912

PYRROLE DIMETHINECYANINE DYES

Earl Van Lare and Leslie G. S. Brooker, Rochester, N. Y., assignors to Eastman Kodak Company, Rochester, N. Y., a corporation of New Jersey No Drawing. Application October 1, 1946, Serial No. 700,392

4 Claims. (Cl. 260—240)

This invention relates to new pyrrole dimethinecyanine dyes useful as therapeutic agents, and to a process for preparing the same.

In the copending application of Leslie G. S. Brooker and Robert H. Sprague, Serial No. 407,033, filed August 15, 1941 (now United States Patent 2,409,612, dated October 22, 1946), as a division of Serial No. 317,726, filed February 7, 1940 (now United States Patent 2,298,731, dated October 13, 1942) there are described pyrrole dimethinecyanine dyes which are useful as light-screening substances in photographic elements. These pyrrole dimethinecyanine dyes while related in some respects to indole dimethinecyanine dyes (purported to have been prepared by condensing an α-methylindole, diphenylformamidine and a cyclammonium quaternary salt containing a reactive methyl group, in the presence of acetic anhydride), cannot be prepared in a manner analogous to that set forth for the indole dyes.

We have now found certain new pyrrole dimethinecyanine dyes and these new dyes are of particular value in the treatment of particular kinds of worm infestations. Our new compounds cannot be prepared in a manner analogous to that set forth for the aforesaid indole dimethinecyanine dyes. It is, accordingly, an object of our invention to provide new compounds. A further object is to provide a process for preparing these new compounds. Other objects will become apparent hereinafter.

The new pyrrole dimethinecyanine compounds of our invention can be represented by the following general formula:

I wherein R represents an alkyl group (i. e. an alcohol radical) e. g. methyl, ethyl, n-propyl, isobutyl, n-butyl, β-hydroxyethyl, β-ethoxyethyl, β-methoxyethyl, γ-hydroxypropyl, etc., $R_1$ represents a member selected from the group consisting of an alkyl group, e. g. methyl, ethyl, ter-amyl, etc., an aryl group, e. g. phenyl, an alkoxyl group, e. g. methoxyl, ethoxyl, etc., a halogen atom, a dialkylamino group, e. g. dimethylamino, diethylamino, etc., and an acylamino group, e. g. acetylamino, propionylamino, heptoylamino, etc., $R_2$ represents a member selected from the group consisting of an alkyl group, e. g. methyl, ethyl, n-propyl, isopropyl, n-butyl, isobutyl, n-amyl, n-heptyl, n-decyl, lauryl, cetyl, benzyl, cyclohexyl, β-methoxyethyl, etc., an aryl group, e. g. phenyl, p-chlorophenyl, p-ethoxyphenyl, etc., $R_3$ represents an alkyl group, e. g. methyl, ethyl, etc., and X represents an anion, e. g. chloride, bromide, iodide, benzenesulfonate, p-toluenesulfonate, acetate, propionate, methylsulfate, ethylsulfate, thiocyanate, etc.

The dyes of this invention are prepared by condensing a pyrrolecarboxaldehyde selected from those represented by the following general formula:

II wherein $R_2$ and $R_3$ have the values given above, with a quinoline quaternary salt selected from those represented by the following general formula:

III wherein R, $R_1$ and X have the values given above. The condensations are advantageously effected in the presence of a secondary amine, e. g. piperidine, 2-methylpiperidine, 3-methylpiperidine, 4-methylpiperidine, 2,4-dimethylpiperidine, 2,6-dimethylpiperidine, etc. The condensations are advantageously effected in a solvent, e. g. methyl, ethyl, n-propyl, isopropyl, n-butyl or isobutyl alcohols.

The following examples will serve to illustrate further the manner of practicing our invention.

*Example 1.—[1,6-dimethylquinoline-(2)] [2,5-dimethyl-1-phenylpyrrole-(3)] dimethinecyanine p-toluenesulfonate*

17.2 g. of 6-methylquinaldine metho-p-toluenesulfonate, 10 g. of 2,5-dimethyl-1-phenyl-3-pyrrolecarboxaldehyde, 75 cc. of methyl alcohol and 10 drops of piperidine were mixed together in a 200 cc. flask. The mixture was refluxed gently for 30 minutes. The mixture was then chilled in a refrigerator and the dye which separated was filtered off. The dye was washed with water and dried. A yield of 8.1 g. (28 per cent) of dye was obtained. The dye was recrystallized from ethyl alcohol and obtained as orange needles, melting at 258 to 259° C. with dec. Analysis: C calc. 73.25, found 73.25; H calc. 6.15, found 6.11.

off, the filtrate concentrated to small volume, cooled and diethyl ether added to precipitate the dye-chloride. The dye-chloride was filtered off and dried. A yield of 10.3 g. (43%) was obtained as orange plates melting at 224 to 225° C. with dec. Analysis: Cl. calc. 7.37; found 7.40.

In the same manner, the following dyes were prepared:

| Dye | Color and Crystalline Appearance | Melting Point, °C. |
|---|---|---|
| [2,5-dimethyl-1-phenylpyrrole-(3)]-[1-ethyl-6-methylquinoline-(2)]-dimethinecyanine chloride. | reddish powder | 264 to 265 with dec. |
| [1,6-dimethylquinoline-(2)]-[1-heptyl-2,5-dimethylpyrrole-(3)]-dimethinecyanine chloride | do | 221 to 223 with dec. |
| [1,6-dimethylquinoline-(2)]-[1,2,5-trimethylpyrrole-(3)]-dimethinecyanine chloride | orange powder | 240 to 241 with dec. |
| [1-cetyl-2,5-dimethylpyrrole-(3)]-[1,6-dimethylquinoline-(2)]-dimethinecyanine chloride | orange plates | 225 to 226 with dec. |
| [2,5-dimethyl-1-phenylpyrrole-(3)]-[1-heptyl-6-methylquinoline-(2)]-dimethinecyanine chloride. | orange powder | 223 to 234 with dec. |
| [2,5-dimethyl-1-phenylpyrrole-(3)]-[1-lauryl-6-methylquinoline-(2)]-dimethinecyanine chloride. | do | 192 to 193 with dec. |
| [2,5-dimethyl-1-phenylpyrrole-(3)]-[1-β-ethoxyethyl-6-methylquinoline-(2)]-dimethinecyanine chloride. | reddish orange powder. | 162 to 165 with dec. |
| [1-benzyl-2,5-dimethylpyrrole-(3)]-[1,6-dimethylquinoline-(2)]-dimethinecyanine iodide | fluffy orange plates | 265 to 267 with dec. |

*Example 2.—[1-ethyl-2,5-dimethylpyrrole-(3)] [1,6-dimethylquinoline-(2)] dimethinecyanine iodide and chloride*

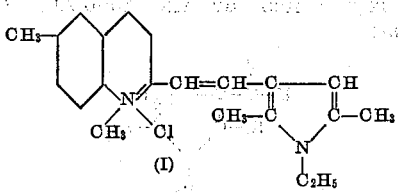

27.2 g. of 6-methylquinaldine methiodide, 14.1 g. of 2,5-dimethyl-1-ethyl-3-pyrrolecarboxaldehyde, 150 cc. of methyl alcohol and 1 cc. of piperidine were mixed in a 200 cc. flask. The mixture was refluxed for 3 hours. The reaction mixture was then chilled and the dye which separated was filtered off. It was washed with acetone, then boiled with water and filtered hot. The dye was then dried. A yield of 18 g. (45%) of dye-iodide was obtained. The dye-iodide was twice recrystallized from methyl alcohol and obtained as crystals melting at 255 to 257° C. with dec. Analysis: I calc. 29.37; found 29.32. The dye-iodide was converted to the dye-chloride by refluxing the dye-iodide, with stirring, with a suspension of 6.5 g. of freshly prepared silver chloride in 2 l. of methyl alcohol for 4 hours. The silver salts were then filtered off, the filtrate concentrated to a small volume, cooled, and diethyl ether added to precipitate the dye-chloride. The dye-chloride was filtered off and dried. A yield of 10.4 g. (33%) was obtained as a felt of orange needles, melting at 231 to 233° C. with dec. Analysis: Cl calc. 10.42; found 10.31.

*Example 3.—[1,6-dimethylquinoline-(2)] [1-lauryl-2,5-dimethylpyrrole-(3)] dimethinecyanine iodide and chloride*

15 g. of 6-methylquinaldine methiodide, 14.6 g. of 2,5-dimethyl-1-lauryl-3-pyrrolecarboxaldehyde, 60 cc. of methyl alcohol and 12 drops of piperidine were mixed together in a 200 cc. flask. The mixture was refluxed for 4 hours. The reaction mixture was then chilled, and the dye-iodide which separated was filtered off. It was washed with acetone and then boiled with water, filtered hot and dried. A yield of dye-iodide of 22 g. (78%) was obtained. The dye-iodide was recrystallized from methyl alcohol 4 times, after which it melted at 203 to 204° C. with dec. Analysis: I calc. 22.17, found 21.73. The dye-iodide was converted to the dye-chloride by refluxing with a suspension of 4.3 g. of silver chloride in 1 l. of methyl alcohol, with stirring, for 4 hours. The silver salts were then filtered

*Example 4.—[1-n-amyl-2,5-dimethylpyrrole-(3)] [1,6-dimethylquinoline-(2)] dimethinecyanine iodide and chloride*

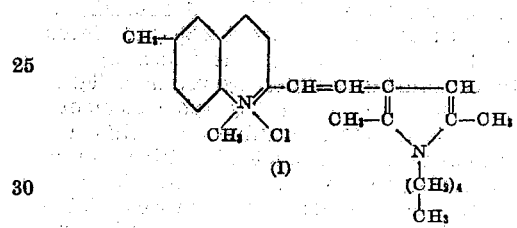

29.9 g. of 6-methylquinaldine methiodide, 20 g. of 1-amyl-2,5-dimethyl-3-pyrrolecarboxaldehyde, 150 cc. of methyl alcohol and 1 cc. of piperidine were mixed in a 200 cc. flask and refluxed for 3 hours. The reaction mixture was then cooled in a refrigerator. The dye which separated was filtered off, washed on the filter with acetone and then with boiling water. A yield of 19.8 g. (42 per cent) of dye-iodide was obtained. The dye-iodide was twice recrystallized from ethyl alcohol to a melting point of 215 to 216° C. with dec. Analysis: I calc. 26.77; found 26.73. It was then converted to the dye-chloride by stirring it with a boiling suspension of 6.7 g. of silver chloride in 500 cc. of methyl alcohol for 4 hours. The silver salts were filtered off and the filtrate concentrated to a small volume. The dye-chloride was precipitated by adding diethyl ether to the concentrate. The dye-chloride was filtered off and dried. A yield of 11.7 g. (31 per cent) of dye-chloride, in the form of a brick-red powder melting at 216 to 220° C., with dec. was obtained. Analysis: Cl calc. 9.26; found 9.63.

*Example 5.—[2,5-dimethyl-1-phenylpyrrole-(3)] [1-β-hydroxyethyl-6-methylquinoline-(2)] dimethinecyanine iodide and chloride*

20 g. of 6-methylquinaldine β-hydroxyethoiodide, 12.1 g. of 2,5-dimethyl-1-phenyl-3-pyrrolecarboxaldehyde, 75 cc. of methyl alcohol and 1 cc. of piperidine are mixed in a 200 cc. flask and refluxed for 4 hours. The reaction mixture was chilled and the dye-iodide which precipitated was filtered off. The dye-iodide was washed on the filter with acetone, then with hot water and dried. A yield of 27.1 g. (87 per cent) was obtained. The dye-iodide was twice recrystallized from methyl alcohol to give orange crystals melting at 286 to 287° C. with dec. Analysis: I calc. 24.88; found 24.80. The dye-iodide was converted to the dye-chloride by stirring the dye-iodide with a boiling suspension of 12 g. of freshly prepared silver chloride in 4 l. of methyl alcohol. The silver salts were filtered off and the filtrate concentrated to a small volume. The dye-chloride was precipitated from the concentrate by the addition of diethyl ether. The dye-chloride was filtered off and dried. A yield of 15 g. (59 per cent), in the form of an orange powder melting at 272 to 273° C. with dec., was obtained. Analysis: Cl calc. 8.47; found 8.56.

*Example 6.*—[1,6-dimethylquinoline-(2)][1 - β-methoxyethyl - 2,5 - dimethylpyrrole-(3)] dimethinecyanine iodide and chloride 29.9 g. of 6-methylquinaldine methiodide, 18.1 g. of 1-β-methoxyethyl-2,5-dimethyl-3-pyrrole-carboxaldehyde, 100 cc. of methyl alcohol and 1 cc. of piperidine were mixed in a 200 cc. flask and refluxed for 4 hours. The reaction mixture was chilled and the dye which separated was filtered off, washed with acetone, and then with boiling water, and dried. A yield of 19 g. (41 per cent) of the dye-iodide was obtained. The dye-iodide was recrystallized four times from methyl alcohol to a melting point of 222 to 224° C. with dec. Analysis: I calc. 24.47; found 27.22. The dye-iodide was converted to the dye-chloride by stirring the dye-iodide with a boiling suspension of 5.9 g. of silver chloride in 1500 cc. of methyl alcohol for four hours. The silver salts were filtered off and the filtrate was concentrated to a small volume. The dye-chloride was precipitated from the concentrate with diethyl ether. The dye-chloride was filtered off and dried. A yield of 8.8 g. (24 per cent), in the form of an orange powder melting at 200 to 202° C. with shrinking at 160° C. was obtained. Analysis: Cl calc. 9.57; found 9.51.

*Example 7.*—[6 - dimethylamino-1-methylquinoline - (2)][2,5-dimethyl-1-phenylpyrrole-(3)] dimethinecyanine iodide and chloride

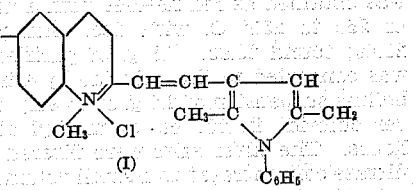

16.4 g. of 6-dimethylaminoquinaldine methiodide, 10 g. of 2,5-dimethyl-1-phenyl-3-pyrrolecarboxaldehyde, 125 cc. of methyl alcohol and 1 cc. of piperidine were mixed in a 200 cc. flask and refluxed for 2 hours. The orange dye-iodide separated in the hot. The reaction mixture was chilled in a refrigerator and when cold the dye-iodide was filtered off. The dye-iodide was washed with acetone and then with boiling water, and dried. A yield of 13.5 g. (53 per cent) of dye-iodide was obtained. It was recrystallized twice from methyl alcohol to a constant melting point of 292 to 293° C. Analysis: I calc. 24.93; found 24.95. The dye-iodide was converted to the dye-chloride by stirring with a boiling suspension of 3.2 g. of freshly prepared silver chloride in 3 l. of methyl alcohol for 4 hours. The silver salts were filtered off and the filtrate concentrated to a small volume. The dye-chloride was precipitated from the concentrate with diethyl ether, and filtered off. A yield of 7 g. (33 per cent), in the form of a deep red powder melting at 249 to 251° C. with dec., was obtained. Analysis: Cl calc. 8.49; found 8.89.

In the same manner the following dyes were prepared:

| Dye | Color and Crystalline Appearance | Melting Point, °C. |
|---|---|---|
| [1-p-chlorophenyl-2,5-dimethyl-pyrrole-(3)] [1,6-dimethylquinoline-(2)] dimethinecyanine chloride. | dull reddish powder | 261 to 263, with dec. |
| [1,6-dimethylquinoline- (2)]-[1-p-ethoxyphenyl-2,5-dimethylpyrrole-(3)]-dimethinecyanine chloride. | reddish orange plates | 245 to 247, with dec. |
| [1-n-amyl-2,5-dimethylpyrrole-(3)]-[1-n-amyl-6-methylquinoline-(2)]-dimethinecyanine iodide. | brownish orange crystals. | 242 to 244, with dec. |
| [1-n-butyl-2,5-dimethylpyrrole-(3)]-[1,6-dimethylquinoline-(2)]-dimethinecyanine iodide. | minute brick red needles. | 227 to 228, with dec. |
| [1-n-decyl-2,5-dimethylpyrrole-(3)]-[1,6-dimethylquinoline-(2)]-dimethinecyanine iodide. | orange powder | 204 to 206, with dec. |
| [1-isopropyl-2,5-dimethylpyrrole-(3)]-[1,6-dimethylquinoline-(2)]-dimethinecyanine iodide. | small brick red needles. | 240 to 241, with dec. |

*Example 8.*—[6-chloro-1-methylquinoline - (2)][2,5 - dimethyl-1-phenyl-pyrrole-(3)] dimethinecyanine iodide and chloride 16 g. of 6-chloroquinaldine methiodide, 10 g. of 2,5 - dimethyl-1-phenyl-3-pyrrolecarboxaldehyde, 100 cc. of methyl alcohol and 0.5 cc. piperidine were mixed in a 200 cc. flask and refluxed for 4 hours. The reaction mixture was chilled and the dye-iodide filtered off. The dye-iodide was washed well with acetone. It was then boiled with water and the suspension filtered hot. The dye-iodide was dried. A yield of 14.2 g. (57 per cent) of dye-iodide was obtained, which after three recrystallizations had a melting point of 261 to 262° C. with dec. Analysis: I calc. 25.35; found 25.53. 7.5 g. of recrystallized iodide was converted to dye-chloride by stirring with a boiling suspension of 3.6 g. of freshly prepared silver chloride in 1500 cc. of methyl alcohol for 4 hours. The silver salts were filtered off and the filtrate concentrated to a small volume. The dye-chloride was precipitated from the concentrate with diethyl ether and filtered off. A yield of 6 g. (17 per cent) of orange powder was obtained of melting point 255 to 257° C., with dec. Analysis: calc. Cl 17.33; found 16.58.

*Example 9.*—[1 - n - amyl-2,5-dimethylpyrrole-(3)][1 - ethyl-6-methyl - quinoline - (2)] dimethinecyanine iodide and chloride 12.5 g. of 6-methylquinaldine ethiodide, 8 g. of 1-n-amyl-2,5-dimethyl-3-pyrrolecarboxaldehyde, 20 cc. of methyl alcohol, and 0.5 cc. of piperidine were mixed in a 200 cc. flask and refluxed for 1½ hours. The reaction mixture was chilled in a refrigerator and when cold, the dye-iodide was filtered off. It was washed with acetone, and then with warm water. The dye-iodide was dried. The yield of dye-iodide was 8.1 g. (42 per cent) which after two recrystallizations has a melting point of 217 to 219° C. with dec. Analysis: I calc. 26.00; found 26.56. 6.6 g. of dye-iodide was converted to the dye-chloride by stirring with a boiling suspension of 2.7 g. of freshly prepared silver chloride in 400 cc. of methyl alcohol for 4 hours. The silver salts were filtered off and the filtrate concentrated to a small volume. The dye-chloride was precipitated from the concentrate with diethyl ether and filtered off. A yield of 5 g. (34 per cent) of dye-chloride, in the form of a reddish orange powder was obtained.

*Example 10.—[1 - n - amyl - 2,5 - dimethylpyrrole - (3)] [6 - methyl - 1 - n - propylquinoline - (2)] dimethinecyanine iodide and chloride*

13.1 g. of 6-methylquinaldine-n-propyliodide, 8 g. of 1-n-amyl-2,5-dimethyl-3-pyrrolecarboxaldehyde, 20 cc. of methyl alcohol, and 0.5 cc. of piperidine were mixed in a 200 cc. flask and refluxed for 1½ hours. The dye-iodide separated out in the hot. The reaction mixture was chilled in the refrigerator and then filtered. The dye-iodide was washed with acetone and then with hot water, and dried. A yield of 15 g. (75 per cent) of dye-iodide was obtained which after two recrystallizations had a melting point of 252 to 253° C. with dec. Analysis: I calc. 25.27; found 25.26. 7.6 g. of purified dye-iodide was converted to dye-chloride by stirring with a boiling suspension of 3 g. of freshly prepared silver chloride in 700 cc. of methyl alcohol for 4 hours. The silver salts were filtered off and the filtrate was concentrated to a small volume. The dye-chloride was precipitated from the concentrate with diethyl ether. The dye-chloride was filtered off and dried. A yield of 6.1 g. (64 per cent) was obtained as a reddish orange powder.

*Example 11.—[1 - cyclohexyl - 2,5 - dimethylpyrrole - (3)] [1,6 - dimethylquinoline - (2)] dimethinecyanine iodide and chloride*

12 g. of 6-methylquinaldine methiodide, 8 g. of 1-cyclohexyl-2,5-dimethyl-3-pyrrolecarboxaldehyde were mixed in a 200 cc. flask and refluxed for 2 hours. The reaction mixture was chilled in the refrigerator and, when cold, the separated dye-iodide was filtered off and washed with acetone. It was then washed with boiling water and dried. A yield of 12.8 g. (66 per cent) of dye-iodide was obtained which after three recrystallizations from methyl alcohol had a melting point of 217 to 218° C. with dec. Analysis: I calc. 26.11; found 26.14, in the form of red needles. 7.6 g. of the purified dye-iodide was converted to dye-chloride by stirring with a boiling suspension of 3.1 g. of freshly prepared silver chloride in 200 cc. of methyl alcohol for 4 hours. The silver salts were filtered off and the filtrate was concentrated to a small volume. The dye-chloride was precipitated from the concentrate with diethyl ether and filtered off. A yield of 6.5 g. (44 per cent) was obtained as an orange powder.

*Example 12.—[2,5 - dimethyl - 1 - n - propylpyrrole - (3)] [1,6 - dimethylquinoline - (2)] dimethinecyanine iodide and chloride*

9 g. of 6-methylquinaldine methiodide, 15 g. of crude 2,5-dimethyl-1-n-propyl-3-pyrrolecarboxaldehyde, 20 cc. of methyl alcohol and 1.5 cc. of piperidine were mixed in a 200 cc. flask and refluxed for 2 hours. The reaction mixture was chilled in the refrigerator and the separated dye-iodide was filtered off. It was washed with acetone, and then with boiling water and dried. A yield of 6 g. (45 per cent) was obtained which after two recrystallizations from ethyl alcohol had a melting point of 234 to 235° C. with dec. Analysis: I calc. 28.45; found 28.21. 7 g. of purified dye-iodide was converted to dye-chloride by stirring with a boiling suspension of 3.1 g. of freshly prepared silver chloride in 500 cc. of methyl alcohol for 4 hours. The silver salts were filtered off and the filtrate concentrated to a small volume. The dye-chloride was precipitated with diethyl ether and the dye-chloride was filtered off. A yield of 5 g. (30 per cent) of dye-chloride was obtained as an orange powder.

*Example 13.—[1 - n - amyl - 2,5 - dimethylpyrrole - (3)] [6 - methoxy - 1 - methylquinoline - (2)] dimethinecyanine iodide and chloride*

12.6 g. of 6-methoxyquinaldine methiodide, 8 g. of 1-n-amyl-2,5-dimethyl-3-pyrrolecarboxaldehyde, 40 cc. of methyl alcohol, and 0.5 cc. of piperidine were mixed in a 200 cc. flask and refluxed for 2 hours. The reaction mixture was chilled in a refrigerator and when cold, the dye-iodide which separated was filtered off. It was washed with acetone, and then with boiling water and dried. A yield of 9.3 g. (47 per cent) of dye-iodide was obtained which after two recrystallizations from methyl alcohol was obtained in the form of brown plates melting at 245 to 246° C. with dec. Analysis: I calc. 25.90; found 26.04. 10 g. of purified dye-iodide was converted to the dye-chloride by stirring with a boiling suspension of 4 g. of freshly prepared silver chloride in 500 cc. of methyl alcohol for 4 hours. The silver salts were filtered off and the filtrate was concentrated to a small volume. The dye-chloride was precipitated from the concentrate with diethyl ether and filtered off. A yield of 7 g. (42 per cent) of dye-chloride was obtained as reddish orange powder.

*Example 14.—[2,5 - dimethyl - 1 - phenylpyrrole - (3)] [6 - enanthamino - 1 - methylquinoline - 2)] dimethinecyanine iodide and chloride*

13.1 g. of 6-enanthaminoquinaldine methiodide, 5 g. of 2,5-dimethyl-1-phenyl-3-pyrrolecarboxaldehyde, 50 cc. of methyl alcohol and 0.25 cc. of piperidine were mixed in a 200 cc. flask and refluxed for 3½ hours. The reaction mixture was chilled in a refrigerator, and when cold, the dye-iodide which separated was filtered off. It was washed with acetone. It was boiled with water and filtered hot, and dried. A yield of 13.1 g. (71 per cent) of dye-iodide was obtained which after two recrystallizations from methyl alcohol was obtained as red needles with a melting point of 250 to 251° C. with dec. Analysis: I calc. 21.40; found 20.93. 7.3 g. of purified dye-iodide was converted to the chloride by stirring with a boiling suspension of 2.7 g. of freshly prepared silver chloride in 700 cc. of methyl alcohol for 4 hours. The silver salts were filtered off and the filtrate concentrated to a small volume. The dye-chloride was precipitated from the concentrate with diethyl ether and filtered off. A yield of 5.9 g. (45 per cent) of dye-chloride as a reddish orange powder of melting point 241 to 243° C. with dec., was obtained. Analysis: Cl calc. 7.07; found 7.26.

*Example 15.—[2,5-dimethyl - 1 - phenylpyrrole - (3)] [1 - methyl - 6 - phenylquinoline - (2)] dimethinecyanine iodide and chloride*

12 g. of 6-phenylquinaldine methiodide, 7.3 g. of 2,5-dimethyl-1-phenyl - 3-pyrrolecarboxaldehyde, 100 cc. of ethyl alcohol, and 12 drops of piperidine were mixed in a 200 cc. flask and refluxed for 1 hour. The reaction mixture was chilled in a refrigerator and the dye-iodide which separated was filtered off. It was washed with acetone, and then washed with water, and then washed again with acetone and dried. A yield of 10.2 g. (56 per cent) was obtained which after two recrystallizations from methyl alcohol was brick red cubes with green reflex of melting point 260 to 261° C. with dec. Analysis: I calc. 23.41, found 22.34. 6.4 g. of purified dye-iodide was converted to chloride by stirring with a boiling suspension of 2.3 g. of freshly prepared silver chloride in 1 l. of methyl alcohol for 3 hours. The silver salts were filtered off and the filtrate concentrated to a small volume. The dye-chloride was precipitated from the concentrate with diethyl ether, filtered off and dried. A yield of 4.6 g. (31 per cent) of reddish orange powder was obtained of melting point 241 to 242° C. with decomposition. Analysis: Cl calc. 7.87; found 7.35.

The above-described dye-chlorides and dye-toluenesulfonates can be converted to the corresponding dye-bromides by treating a hot methyl alcoholic solution of the dye-chloride or dye-toluenesulfonate with a concentrated aqueous solution of potassium bromide. The dye-bromide separates out, upon chilling, if necessary. The above-described dye-iodides can be converted to the corresponding dye-perchlorates by treating a hot methyl alcoholic solution of the dye-iodide with a concentrated aqueous solution of sodium perchlorate. The dye-perchlorate separates out. Dye-thiocyanates can be made from the dye-iodides by stirring the dye-iodide with a hot methyl alcohol suspension of silver thiocyanate, filtering off the silver salts, and isolating the dye-thiocyanate from the methyl alcoholic solution.

The herein-described compounds are of particular value in the treatment of worm infestations where the invading organism is of the class Nematoda (round worms). Among the various species of worms affected by these compounds are hookworms, ascarids, filarids and whipworms.

In the above general Formula I, the compounds wherein the total number of carbon atoms contained in the two groups R and $R_2$ is from 5 to 18 are especially useful in the treatment of worm infestations. The compounds of general Formula I, wherein X represents chloride, benzenesulfonate, p - toluenesulfonate, methylsulfate, ethylsulfate, acetate or propionate are the more soluble compounds and the most useful therapeutically.

The pyrrolecarboxaldehydes employed herein can be prepared by condensing formamide with a pyrrole base selected from those represented by the following general formula:

III 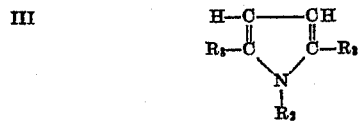

wherein $R_2$ and $R_3$ have the values given above, in the presence of phosphorus oxychloride, according to the method of Nenitzeseu and Isacescu, Bull. Soc. Chim. Romania 11, 135 (1929). Details of this preparation are also given by Brooker and Sprague Jour. Am. Chem. Soc. 67, 1869 (1945), and by Brooker and Sprague in their copending application Serial No. 407,033, filed August 15, 1941. The pyrrole bases of Formula III can be prepared according to the process of Lions et al., Proc. Royal Soc., New South Wales, 71, 92 (1937).

The quinoline quaternary salts employed herein can be prepared in known manner, by heating the quinoline bases with the appropriate alkyl salt, e. g. methyl iodide, methyl p-toluenesulfonate, n-butyl bromide, dimethyl sulfate, etc. at temperatures of from about 90° to 150° C., heating the base and alkyl salt in a sealed tube where the alkyl salt is too volatile to permit sufficient heating under reflux.

The quinoline bases themselves are known and can be prepared according to the general method described in Ber. 16, 2465 (1883). 6-enanthaminoquinaldine can be prepared by treating 6-aminoquinaldine with enanthyl chloride in chloroform, in the presence of sodium carbonate, using the procedure described by Hamer, J. Chem. Soc. 119, 1436 (1921) for the preparation of 6-cinnamoylaminoquinaldine.

What we claim as our invention and desire to be secured by Letters Patent of the United States is:

1. The compounds which are represented by the following general formula:

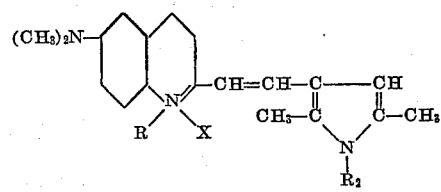

wherein R represents a primary alkyl group containing from 1 to 4 carbon atoms, $R_2$ represents an aryl group of the benzene series, the total number of carbon atoms in the R and $R_2$ groups being from 5 to 18, and X represents an anion.

2. The compound which is represented by the following formula:

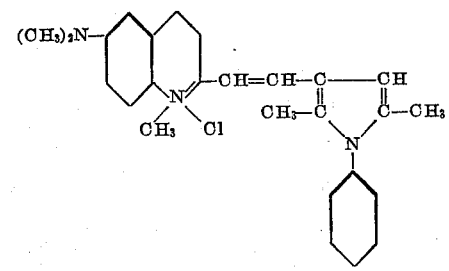

3. The compounds which are represented by the following general formula:

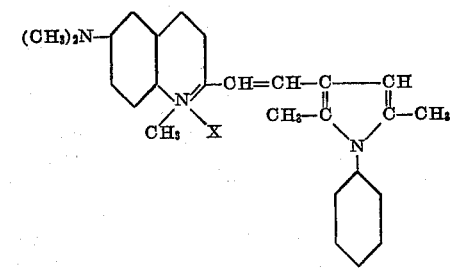

wherein X represents an anion.

4. The compound which is represented by the following formula:
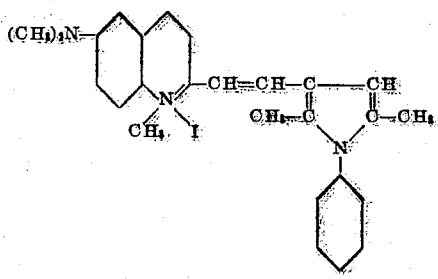
EARL VAN LARE.
LESLIE G. S. BROOKER.
REFERENCES CITED
The following references are of record in the file of this patent:
UNITED STATES PATENTS
| Number | Name | Date |
|---|---|---|
| 2,052,754 | Dieterle | Sept. 1, 1936 |
| 2,161,339 | Dieterle | June 6, 1939 |
| 2,298,731 | Brooker | Oct. 13, 1942 |
| 2,409,612 | Brooker | Oct. 22, 1946 |
| 2,425,772 | Wilson | Aug. 19, 1947 |